United States Patent
Shyur et al.

(10) Patent No.: US 7,737,842 B2
(45) Date of Patent: Jun. 15, 2010

(54) GLOBAL POSITION SYSTEM DEVICE

(75) Inventors: Jui-Chun Shyur, Taipei (TW);
Wei-Huan Chou, Taipei (TW);
Jian-Ming Peng, Taipei (TW);
Kai-Chen Tien, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 281 days.

(21) Appl. No.: 11/837,548

(22) Filed: Aug. 13, 2007
(Under 37 CFR 1.47)

(65) Prior Publication Data

US 2008/0186227 A1 Aug. 7, 2008

(30) Foreign Application Priority Data

Aug. 14, 2006 (TW) ............................... 95129745 A

(51) Int. Cl.
*G08B 1/00* (2006.01)

(52) U.S. Cl. ............ 340/539.2; 340/995.2; 340/539.13; 340/815.78; 340/985; 340/995.1; 701/200; 701/202; 701/213

(58) Field of Classification Search ............... 340/573.1, 340/990, 573.4, 502, 539, 539.2, 539.13, 340/815.78, 985, 995.1, 995.2; 342/357.06; 701/200, 201, 213

See application file for complete search history.

(56) References Cited

U.S. PATENT DOCUMENTS

| | | | | |
|---|---|---|---|---|
| 4,056,781 | A * | 11/1977 | Hetebrij et al. | 340/7.21 |
| 5,289,163 | A * | 2/1994 | Perez et al. | 340/539.32 |
| 5,890,084 | A * | 3/1999 | Halasz et al. | 701/45 |
| 5,995,833 | A * | 11/1999 | Zicker | 455/430 |
| 6,075,442 | A * | 6/2000 | Welch | 340/573.1 |
| 6,078,260 | A * | 6/2000 | Desch | 340/573.1 |
| 6,104,926 | A * | 8/2000 | Hogg et al. | 455/431 |
| 6,268,798 | B1 * | 7/2001 | Dymek et al. | 340/573.1 |
| 6,363,324 | B1 * | 3/2002 | Hildebrant | 701/213 |
| 6,389,358 | B2 * | 5/2002 | Uchigaki | 701/209 |
| 6,408,180 | B1 * | 6/2002 | McKenna et al. | 455/431 |
| 6,529,131 | B2 * | 3/2003 | Wentworth | 340/573.1 |
| 6,738,712 | B1 * | 5/2004 | Hildebrant | 701/213 |
| 6,828,907 | B1 * | 12/2004 | Galle | 340/539.11 |
| 7,148,801 | B2 * | 12/2006 | Crabtree et al. | 340/539.13 |

* cited by examiner

*Primary Examiner*—Daniel Wu
*Assistant Examiner*—Son M Tang
(74) *Attorney, Agent, or Firm*—Jianq Chyun IP Office

(57) ABSTRACT

A global position system device including a host and a plurality of direction indicating lights is provided. The direction indicating lights are disposed at the host, wherein each direction indicating light is represented as one direction. The host controls the direction indicating lights such that one of the direction indicating lights is bright and the others are dark. Then, users are indicated by the direction indicating lights to make a turn or keep running straightforward.

5 Claims, 3 Drawing Sheets

GLOBAL POSITION SYSTEM DEVICE

CROSS-REFERENCE TO RELATED APPLICATION

This application claims the priority benefit of Taiwan application ser. no. 95129745, filed Aug. 14, 2006. All disclosure of the Taiwan application is incorporated herein by reference.

BACKGROUND OF THE INVENTION

1. Field of the Invention

The present invention generally relates to a global position system (GPS) device. More particularly, the present invention relates to a global position system device, by which a user can identify the moving direction readily.

2. Description of Related Art

Global position system (GPS) is a navigation system that combines satellite technology with wireless technology for providing the position, speed, and time of a particular location. Along with the improvement of the satellite technology, business opportunities related to GPS has been rapidly developed. Through the combination of space satellites and advanced communication equipment, the technology makes a revolutionary change in the applications of our daily life. For example, a moving vehicle can use GPS to determine the exact time and path to reach a destination; an ambulance can provide with emergency medical care more effectively; the driver of a vehicle can obtain the current position and destination through an electronic map.

GPS automatic vehicle guidance system (AVGS), employs the GPS technology, wherein the satellite antenna installed inside the vehicle is incorporated with the embedded GIS database to display the current location on the computer screen, so as to guide the driver while driving. In addition, the driver can select the driving path to arrive the destination more quickly.

However, the aforementioned GPS automatic vehicle guidance system is constructed on the car, which increases the manufacturing cost of the car as well as the purchase loading of the consumer. Due to the above drawback, a mobile device with GPS function is developed.

The GPS mobile device reminds a user of the moving direction through a display panel and a voice device. Thus, the display panel needs to display the moving direction continuously and consumes the power of the GPS device. Further, the display panel of the GPS device is small. The users may make a wrong decision when observing the unclear direction indication on the display panel. Additionally, the environment noise may disturb the reminding of the GPS device and affect the decision of the users.

SUMMARY OF THE INVENTION

The present invention is directed to a GPS device, by which the user can identify the moving direction readily.

As embodied and broadly described herein, the present invention provides a GPS device, which comprises a host and plural direction indicating lights. The host outputs a direction signal. The direction indicating lights are disposed at the host and controlled by the host to be bright or not, so as to indicate the users' moving direction.

According to an embodiment of the present invention, the host comprises a housing, a circuit board and a display panel. The circuit board is disposed in the housing and electrically connected with the direction indicating lights. The display panel is disposed on the surface of the housing and electrically connected with the circuit board.

According to an embodiment of the present invention, the direction indicating lights comprise three direction indicating lights respectively representing acts of turning left, turning right, and moving straight.

According to an embodiment of the present invention, the display panel is turned off as one of the direction indicating lights is bright.

According to an embodiment of the present invention, the host further comprises a plurality of function keys disposed on the surface of the housing and electrically connected with the circuit board.

According to an embodiment of the present invention, each direction indicating light comprises a light source and a light guiding sheet. The light source is disposed on the circuit board, and the light guiding sheet is disposed on the surface of the housing and located above the light source.

According to an embodiment of the present invention, the light source is an organic light emitting diode.

The GPS device of the present invention has plural direction indicating lights. Thus according to the bright or not of the direction indicating lights the users can identify their moving direction readily. Furthermore, the display panel can be turned off, so as to reduce the electric consumption and extend the available time of the GPS device.

In order to the make aforementioned and other objects, features and advantages of the present invention comprehensible, a preferred embodiment accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
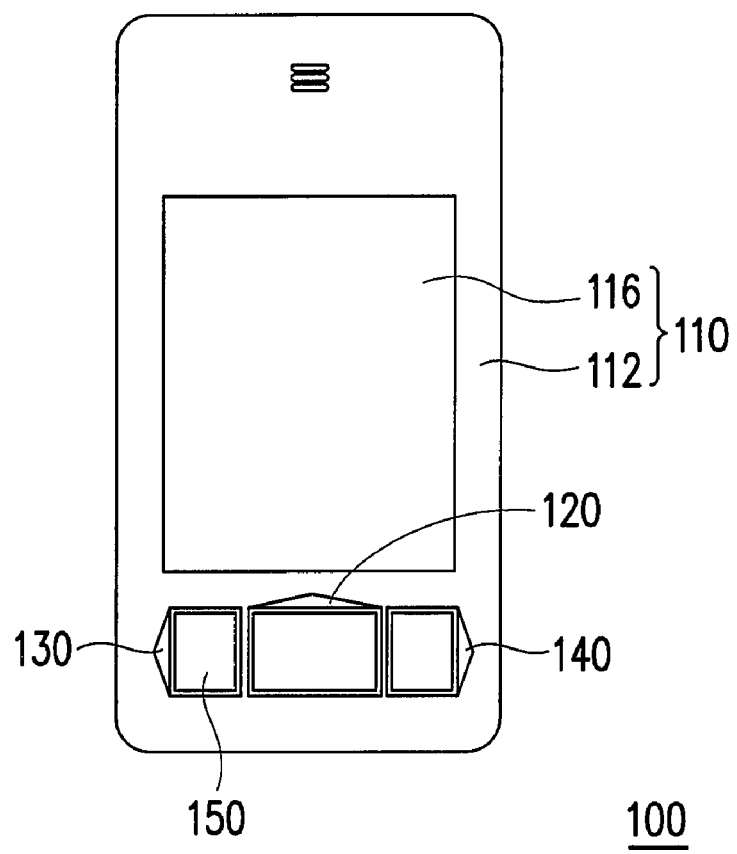
FIG. 1 is a schematic view illustrating a GPS device of the present invention.

FIG. 1 is a schematic view illustrating a GPS device of an embodiment of the present invention. Referring to FIG. 1, the GPS device 100 of this embodiment comprises a host 110 and three direction indicating lights 120, 130 and 140. The direction indicating lights 120, 130 and 140 are disposed in the host 110 for representing three different moving directions. In the GPS device 100 of this embodiment, the direction indicating lights 120, 130 and 140 are controlled to show bright or not according to a direction signal of the host 110 to indicate the moving direction for the user. For instance, the direction indicating light 120 is controlled to be bright and the direction indicating lights 130 and 140 are controlled to be dark, so as to indicate the moving direction for the user.

Figure 2:
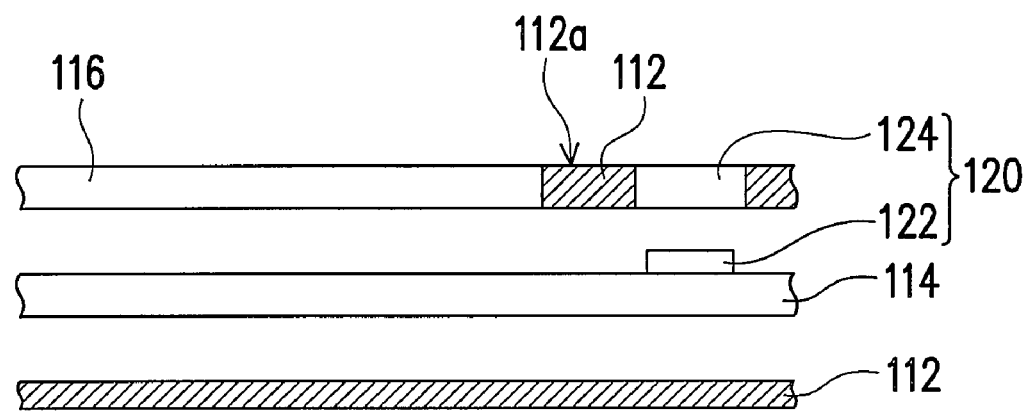
FIG. 2 is a sectional view of the GPS device in FIG. 1.

FIG. 2 is a sectional view of the GPS device in FIG. 1. Referring to both FIGS. 1 and 2, specifically, the host comprises a housing 112, a circuit board 114 and a display panel 116. The housing 112 has a surface 112a, and the circuit board 114 is disposed in the housing 112 and electrically connected with the direction indicating lights 120, 130 and 140 respectively. In this embodiment, the circuit board 114 is a printed circuit board (PCB). The display panel 116 is disposed on the surface 112a of the housing 112 and electrically connected with the circuit board 114. The display panel 116 of this embodiment may be a liquid crystal display (LCD) panel.

Referring to both FIGS. 1 and 2, the direction indicating light 120 comprises a light source 122 and a light guiding sheet 124, wherein the light source 122 is disposed on the circuit board 114 and the light source 122 may be an organic light emitting diode. The light guiding sheet 124 is disposed on the surface 112a of the housing 112 and located above the light source 122. In this embodiment, the light source 122 is controlled by the direction signal of the host 110 to emit light, and the light pass through the light guiding sheet 124 to make the direction indicating light 120 being bright.

The GPS device 100 may include plural function keys 150 disposed on the surface 112a and electrically connected with the circuit board 114 for the users to show the moving path by locating the present position and setting the destination.

When using the GPS device 100, the function keys 150 is pressed firstly to select the locating function, so as to located the present position of the user. Then, select the destination and map out an optimum path or a shortest path by the program of the GPS device 100. The optimum path or the shortest path is displayed by the display panel 116.

After the user selects an optimum path or a shortest path, the display panel 116 can be manually turned off and doesn't show the moving path anymore. Thus, the GPS device 100 is in a power saving mode. Alternatively, the GPS device 100 can be set to start the power saving mode automatically when receiving no signal for a predetermined period. In the meanwhile, the direction indicating lights 120, 130 and 140 are controlled by the direction signal of the host 110 to be bright or not selectively, so as to indicate the users to move straight or make a turn. Since the GPS device 100 can indicate the moving direction of the users by the direction indicating lights 120, 130 and 140 in the power saving mode, the available time of the GPS device 100 can be prolonged.

Figure 3:
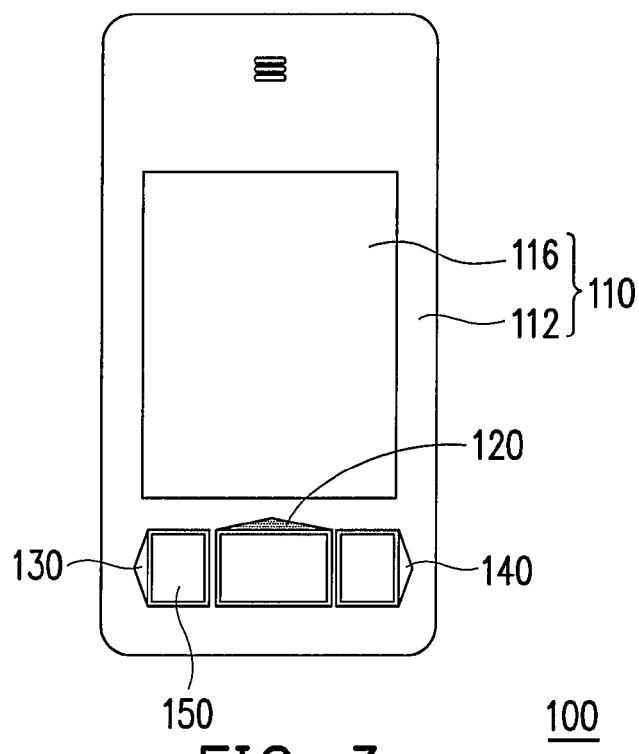
FIGS. 3, 4 and 5 respectively shows the GPS device indicating the users moving straight, making a left turn and making a right turn.
Figure 4:
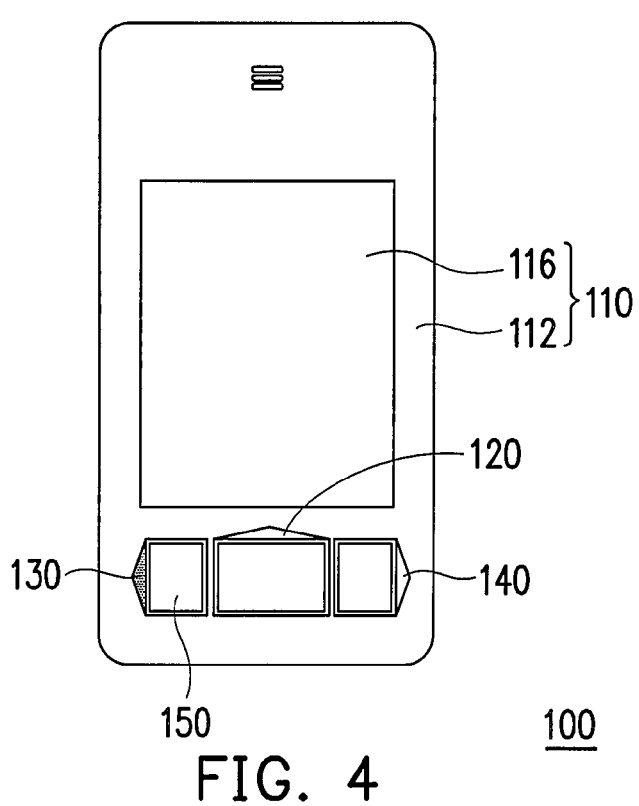
Figure 5:
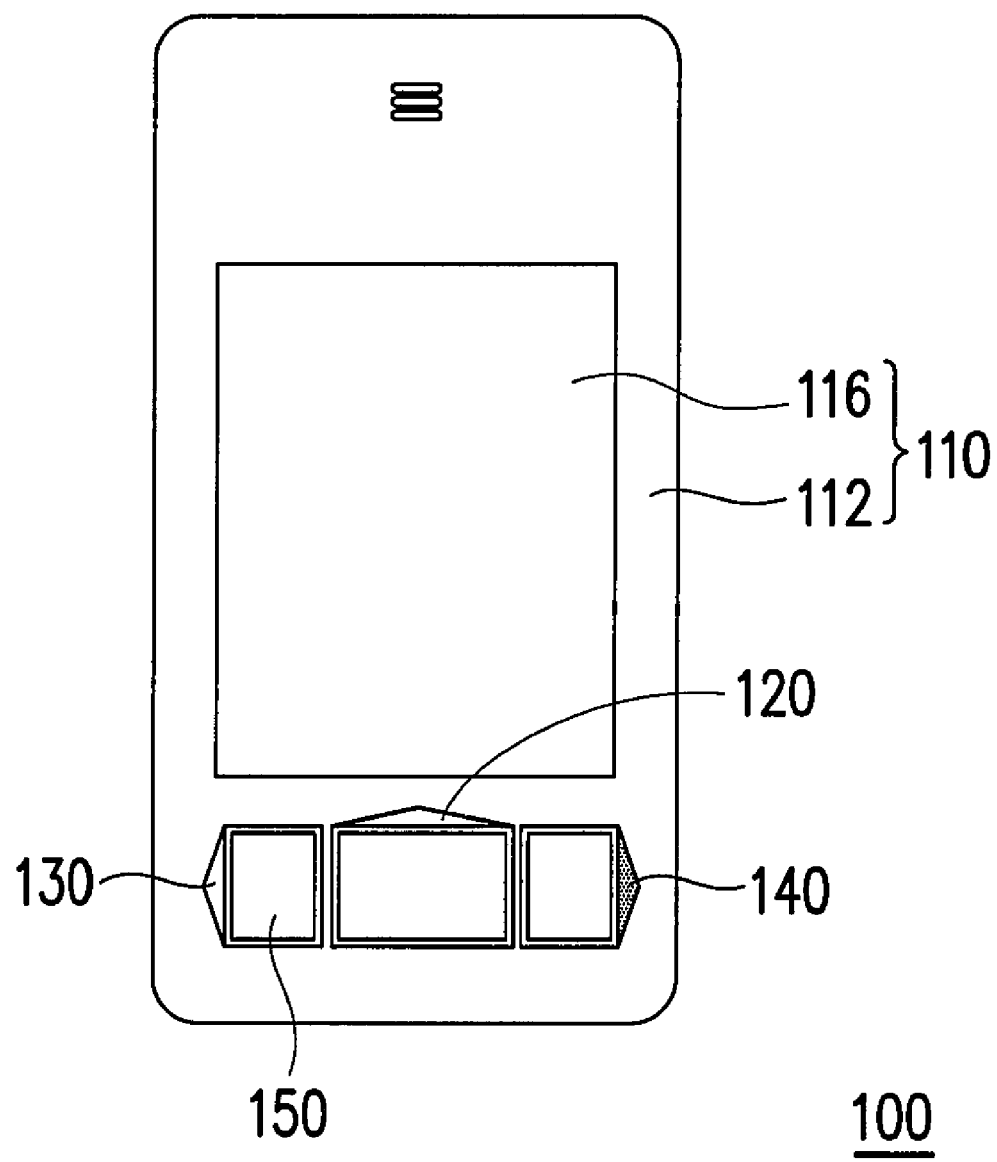

FIGS. 3, 4 and 5 respectively shows the GPS device indicating the users running straightforward, making a left turn and making a right turn. Referring to FIG. 3, the direction indicating light 120 is controlled to be bright and the direction indicating lights 130 and 140 are controlled to be dark, so as to indicate to keep running straightforward for the user. It is noted that the GPS device 100 is in power saving mode, and the display panel 116 is turned off. But, the user can still notice the direction indicating light 120 being bright, and keep running straightforward.

Similarly, as shown in FIG. 4, when the moving path mapped by the GPS device 100 indicates to turn left at the next intersection, the direction indicating light 120 is switched off and the direction indicating light 130 gets into bright to remind the user to make the left turn before arriving the next intersection.

In the same way, as shown in FIG. 5, when the moving path mapped by the GPS device 100 indicates to turn right at the next intersection, the direction indicating lights 120 and 130 are dark and the direction indicating light 140 gets into bright to remind the user to make the right turn before arriving the next intersection.

Furthermore, for the situation of driving beyond the original mapped moving path, a direction indicating light of driving in reverse can be set on the GPS device 100, so as to remind the user to reverse or back the car to the original mapped moving path.

Accordingly, the GPS device of the present invention provides a safer indicating manner for the user by using the direction indicating lights. Additionally, the power consumption for driving the display panel can be saved by the use of the direction indicating lights, and the available time of the GPS device is prolonged. Therefore, the GPS device brings more convenience and safety to the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A global position system device, comprising:
 a host, used to output a direction signal, comprising:
  a housing;
  a circuit board, disposed in the housing;
  a display panel, disposed on the surface of the housing and electrically connected with the circuit board, a map out path is displayed by the display panel; and
 a plurality of direction indicating lights disposed separately from and adjacent to the display panel at the host and electrically connected with the circuit board, the direction indicating lights are controlled to be bright or not by the host according to the direction signal, and the display panel is automatically turned off as one of the direction indicating lights is bright.

2. The global position system device of claim 1, wherein the direction indicating lights comprise three direction indicating lights respectively representing acts of turning left, turning right, and running straightforward.

3. The global position system device of claim 1, wherein the host further comprises a plurality of function keys disposed on the surface of the housing and electrically connected with the circuit board.

4. The global position system device of claim 1, wherein each direction indicating light comprises:
 a light source, disposed on the circuit board; and
 a light guiding sheet, disposed on the surface of the housing and located above the light source.

5. The global position system device of claim 4, wherein the light source comprises organic light emitting diode.

* * * * *